United States Patent Office 3,629,167
Patented Dec. 21, 1971

3,629,167
TWO-PACKAGE EPOXY-URETHANE COATING COMPOSITION
Roy A. Allen, Iselin, and George R. Somerville, Morristown, N.J., assignors to Shell Oil Company, New York, N.Y.
No Drawing. Filed Jan. 31, 1969, Ser. No. 795,684
Int. Cl. C08g 45/12
U.S. Cl. 260—18
10 Claims

ABSTRACT OF THE DISCLOSURE

A two-package epoxy-urethane coating system having improved low temperature curing properties comprises: (1) a precondensate prepared by reacting a polymeric fatty acid, an amine and a polyepoxide having more than one vic-epoxy group and (2) an organic polyisocyanate (or polyisothiocyanate).

BACKGROUND OF THE INVENTION

Isocyanate-cured and polyamide-cured systems based on unmodified epoxy resins are known; however, these systems do not exhibit the desired degree of water resistance and flexibility for many end uses, such as in marine paints and enamels.

It has now been found that these shortcomings can be significantly reduced when a special epoxy-precondensate is utilized with a cross-linking agent containing isocyanato groups.

SUMMARY OF THE INVENTION

The present two-package system has excellent low temperature curing properties, i.e., in the range of from 25° to 35° F., and produces superior properties of film integrity, flexibility and water resistance compared to commercial two-package systems based on isocyanate or polyamide cures.

The present two-package composition comprises (1) a precondensate prepared by reacting (a) polyepoxide having more than one vicinal epoxy group per molecule, (b) a special amine combination and (c) a polymeric fatty acid, and (2) a polyisocyanate or polyisothiocyanate.

A further significant advantage of the present composition is the control over the reaction rate by adjusting or varying the amine combination. In other words, the reactivity of the precondensate with respect to the isocyanato groups can be directly varied with the level of the aliphatic amine in combination with the aromatic amine such as aniline.

DESCRIPTION OF THE PREFERRED EMBODIMENT

The present invention provides a two-package epoxy-urethane coating system exhibiting improved low temperature curing properties, excellent water-resistance and improved flexibility.

The linear precondensate polymer is simply made by a reacting a polyepoxide in a two-step process with (1) a polymeric fatty acid and (2) a mixture of aromatic and aliphatic amines, in amounts sufficient to give an epoxy-terminated precondensate resin.

A solution of the precondensate resin is then mixed with a polyisocyanate (or polyisothiocyanate) to give a coating system suitable for use at low temperature conditions, i.e., about 25° to 35° F.

PRECONDENSATE RESIN

The precondensate resin is prepared in a two-step method wherein the polyepoxide is reacted with a polymeric fatty acid, preferably in the presence of a suitable catalyst such as triphenylphosphonium ethyliodide. In general, the amounts of polyepoxide and polymeric fatty acid will vary widely; however, it is generally desirable to use from about 0.1 to 0.9 chemical equivalent of polymeric fatty acid per chemical equivalent of polyepoxide, with from about 0.5 to 0.75 chemical equivalent being preferred.

The polyepoxide, polymeric fatty acid and catalyst are charged into a reactor and heated to a temperature from about 125° to 250° C., and preferably from about 125° to 200° C., for 15 minutes to one hour or longer, or until the acid number is less than about 0.5. The epoxy-polymeric acid product is then cooled to about 100° to 125° C. and the aromatic-aliphatic amine component is added and the reaction is allowed to exotherm, usually about an hour. The reaction mixture is agitated for an additional 15 to 30 minutes after peak isotherm of about 200° C. The reaction mixture is then poured out and allowed to cool.

POLYEPOXIDES

The polyepoxide materials used in preparing the compositions of the present invention comprise those organic materials which have more than one vic-epoxy group, i.e., more than one

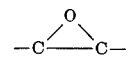

group, which may be in a terminal position, i.e., a

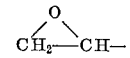

group, or in an internal position, i.e., a

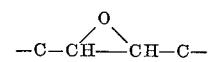

The polyepoxides may be saturated or unsaturated, aliphatic or cycloaliphatic, aromatic or heterocyclic and may be substituted with substituents, such as chlorine, hydroxyl groups, ether radicals, and the like.

Examples of such polyepoxides include, among others, 1,4 - bis(2,3 - epoxypropoxy)benzene, 1,3 - bis(2,3-epoxypropoxy)benzene, 4,4' - bis(2,3 - epoxypropoxy) diphenyl ether, 1,8 - bis(2,3 - epoxypropoxy)octane, 1,4-bis(2,3 - epoxypropoxy)cyclohexane, 4,4' - bis(2-hydroxy-3,4' - epoxybutoxy)diphenyl dimethylmethane, 1,3 - bis-(4,5 - epoxypentoxy) - 5 - chlorobenzene, 1,4 - bis(3,4-epoxybutoxy) - 2 - chlorocyclohexane, 1,3 - bis(2-hydroxy - 3,4 - epoxybutoxy)benzene, 1,4 - bis(2-hydroxy-4,5-epoxypentoxy)benzene.

Other examples include the epoxy polyethers of polyhydric phenol with a halogen-containing epoxide or dihalohydrin in the presence of an alkaline medium. Polyhydric phenols that can be used for this purpose include among others, resorcinol, catechol, hydroquinone, methyl resorcinol, or polynuclear phenols, such as 2,2-bis(4 - hydroxyphenyl)propane (Bisphenol A), 2,2-bis(4-hydroxyphenol)butane, 4,4' - dihydroxybenzophenone, bis(4 - hydroxyphenyl)ethane, 2,2 - bis(4-hydroxyphenyl) pentane and 1,5 - dihydroxynaphthalene. The halogen-containing epoxides may be further exemplified by 3-chloro-1,2-epoxybutane, 3 - bromo - 1,2 - epoxyhexane, 3 - chloro - 1,2 - epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. 2,633,458 and are designated polyethers A, B, C and D.

Another group of polyepoxides comprises the polyepoxypolyethers obtained by reacting, preferably in the presence of an acid-acting compound, such as hydrofluoric acid, or of the aforedescribed halogen-containing epoxides, such as epichlorohydrin with a polyhydric alcohol, and subsequently treating the resulting product with an alkaline component. As used herein and in the claims the expression "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyalkyl alcohol, polyvinyl alcohol, inositol, trimethylolpropane, bis(4-hydroxycyclohexyl) dimethylmethane and the like.

The preparation of suitable such polyepoxide polyethers is illustrated in U.S. 2,633,458 as polyether F.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products, preferably have an epoxy equivalency greater than 1.0, and still more preferably between 1.1 and 4 and a molecular weight between 300 and 1000.

Another group of polyepoxides include the epoxy esters of polybasic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides haxing internal epoxy groups include, among others, the epoxidized esters of polyethylenically unsaturated monocarboxylic acids, such as epoxidized linseed, soyabean, perilla, oiticica, tung, walnut, and dehydrated castor oil, methyl linoleate, butyl linolinate, ethyl 9,12-octadecadienoate, butyl 9,12,15-octadecatrienoate, ethyl eleostearate, octyl 9,12-octadecadienoate, methyl eleostearate, monoglycerides to tung oil fatty acids, monoglycerides of soyabean oil, sunflower, rapeseed, hempseed, sardine, cottonseed oil, and the like.

Another group of the epoxy-containing materials having internal expoxy groups include the epoxidized esters of unsaturated alcohols having the ethylenic group in an internal position and polycarboxylic acids, such as, for example, di(2,3-epoxybutyl)adipate, di(2,3-epoxybutyl) oxalate, di(2,3-epoxyhexyl)succinate, di(2,3-epoxyoctyl) tetrahydrophthalate, di(4,5-epoxydodecyl)maleate, di(2,3-epoxybutyl)terephthalate, di(2,3-epoxypentyl)thiodipropionate, di(2,3-epoxybutyl)citrate and di(4,5-epoxyoctadecyl)malonate, as well as the esters of epoxycyclohexanol and epoxycyclohexylalkanols, such as, for example, di(2,3-epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate, 3,4-epoxyhexyl, 3,4-epoxypentanoate, 3,4-epoxycyclohexyl, 3,4-cyclohexanoate, 2,3-epoxycyclohexylmethyl 2,3-epoxycyclohexanoate, and 3,4-epoxycyclohexyl 4,5-epoxyoctanoate, and the like.

Another group of materials having internal epoxy groups include epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,11,13-diepoxyeicosanedioate, dibutyl 7,8,11,12-diepoxyoctadecanedioate, dioctyl 10,11-diethyl-8,9,12,13-diepoxyeicosanedioate, dicyclohexyl 3,4-5,6-diepoxycyclohexanedicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Still another group includes epoxidized hydrocarbons, such as epoxidized 2,3-bis(cyclohexenyl)propane, 2,2-bis(cyclohexenyl)butane, 8,10-octadecadiene and the like.

Polyepoxides having an epoxy equivalent weight of between 400 and 4,000 are preferred. Polyepoxides having an average molecular weight above 500, as for example, between about 800 and 1500 and between about 2700 and 3100 are especially preferred Very suitable polyepoxides are those formed from an epihalohydrin, and particularly epichlorohydrin, and a polyhydric compound, such as 2,2-bis(4-hydroxyphenyl)propane or glycerol.

Other examples include the glycidated monolacs as obtained by reacting epichlorohydrin with novon resins obtained by the condensation of aldehydes with polyhydric phenols.

POLYMERIC FATTY ACIDS

The polymeric fatty acids which are suitable for use in preparing the present precondensates are preferably the dimer and trimer acids obtained by polymerizing unsaturated fatty acids, such as soyabean oil fatty acids and the like. Particularly preferred are the dimerized acids obtained from the ethylenically unsaturated fatty acids or mixtures thereof derived from semidrying and drying oils, and particularly the conjugated fatty acids containing at least 12 and generally from about 12 to about 20 carbon atoms, such as 9,11-octadecadienoic acid and other acids within the generic formula

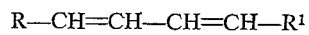

wherein R is a —R²COOH radical, R¹ is either a

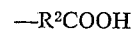

group or an alkyl radical and R² is an alkyl radical. These acids polymerize to form dimer acids of the general formula

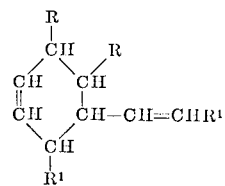

Other suitable dimer acids include those obtained from linoleic acid, linolenic acid, eleosteric acid, ricinoleic acid, Still another group of dimers are those obtained from dibasic acids such as 8,12-eicosadiene-1,20-diocic acid, 8-vinyl-10-octadecene-1,18-dioic acid, 7,11-octadecadiene-1,18-dioic acid, and the like. Dimer acids are available commercially and are sold under various trade names. A suitable such acid includes Empol 1014, a viscous aliphatic polybasic acid produced by the polymerization of unsaturated fatty acids at mid-molecule and containing 1% $C_{18}$ monobasic fatty acid, 95% $C_{36}$ dibasic fatty acid, and 4% $C_{54}$ tribasic fatty acid, acid value 188–193, saponification value 195–198 and neutralization equivalent 292–298.

The polymerization may be effected by utilizing the lower aliphatic esters of the unsaturated acids so as to prevent decarboxylation during the heating period, and the converting the ester groups to carboxyl groups through hydrolysis. This process is illustrated in the Industrial and Engineering Chemistry, page 89, volume 33 (1941) and page 1139, volume 38 (1946).

According to a modified embodiment of the present invention, a saturated normal aliphatic dicarboxylic acid is used instead of a dimer acid in preparing the condensation product. Preferred saturated acids include acids having 6 to 10 carbon atoms in their molecule, such as adipic, suberic, azelaic and sebacic acids, although the higher molecular weight acids are also suitable.

Also included are the trimerized acids obtained from the ethylenically unsaturated fatty acids as derived from semi-drying and drying oils, and particularly, the conjugated fatty acids containing from 12 to 20 carbon atoms. The generic structure of the resulting trimerized acids is believed to be that of the following:

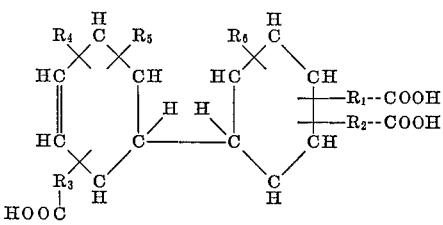

In the above formula, $R_1$, $R_2$ and $R_3$ constitute alkylene radicals having between 4 to 10 carbon atoms each, while $R_4$, $R_5$ and $R_6$ are alkyl radicals having between 4 and 10 carbon atoms each. Normally, the products will have the generic formula as follows:

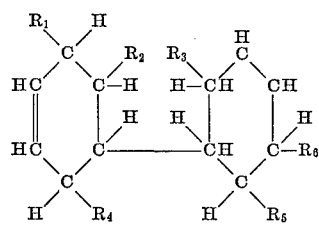

According to a modified embodiment of the present invention, a saturated, normal aliphatic dicarboxylic acid may be substituted for a part of the dimer acid in preparing the precondensate. In general, up to about 50%, and preferably less than about 25% by weight of the dimer acid is replaced with such aliphatic dicarboxylic acid. Preferred saturated acids include acids having 6 to 10 carbon atoms in their molecule, such as adipic, suberic, azelaic and sebacic acid, although the higher molecular weight acids are also suitable.

AMINES

The amines used to prepare the instant precondensates comprise a mixture of aromatic and aliphatic amines. As noted hereinbefore, by varying the proportion of aliphatic amines to aromatic amines, the curing rate can be conveniently varied to desired values.

Suitable aromatic amines include the primary, secondary and tertiary amines such as aniline, ortho-, meta-, and paratoluidine, the xylidines, the phenylenediamines, N-methylaniline, N-ethylaniline, dimethylaniline, triphenylamine, alpha-naphthylamine, beta-naphthylamine, pyridine and substituted pyridines and benzylamine.

Suitable aliphatic amines include the aliphatic and cycloaliphatic, primary, secondary and tertiary amines, preferably containing up to 15 carbon atoms, such as methylamine, ethylamine, propylamine, isopropylamine, butylamine, isobutylamine, sec-butylamine, tert-butylamine, amylamine, isoamylamine, sec-amylamine, tert-amylamine, hexylamine, heptylamine, diisopropylamine, dibutylamine, diisobutylamine, diisoamylamine, trimethylamine, triethylamine, tripropylamine, tributylamine, triisobutylamine, cyclohexylamine, and cycloheptylamine.

The ratio of aromatic amine to aliphatic amine will vary within wide limits depending upon the end curing properties desired. In general, however, the weight ratio of aromatic amine to aliphatic amine will range from amout 4:1 to 1:4 with from about 1:2 to 2:1 being preferred.

CURING ACCELERATORS OR CATALYSTS

The organo-substituted phosphines that may be used as catalysts in the reaction between dicarboxylic acid and epoxy resin may be exemplified by the formula $P(R)_3$ wherein at least one R is an organic radical and the other R's are hydrogen or organic radicals which may be the same or different from the first R. Preferred phosphines include the trihydrocarbyl phosphines, the dihydrocarbyl phosphines and monohydrocarbyl phosphines, such as tricyclohexyl phosphine, triphenyl phosphine, trioctyl phosphine, tributyl phosphine, trixylyl phosphine, tridodecyl phosphine, cyclohexyl octyl phosphine and the like. Particularly preferred phosphines include the trialkyl, the tricycloalkyl, the tri(alkylcycloalkyl), and the triaryl and tri(alkaryl)phosphines and particularly those wherein each of the hydrocarbon radicals attached to the phosphorus atoms contains no more than 12 carbon atoms, and still more preferably no more than 8 carbon atoms, with a total number of carbon atoms preferably not being more than 30.

Of special importance, particularly because of their high degree of catalyst activity are the aromatic hydrocarbyl phosphines such as triphenylphosphine although the aliphatic phosphines such as tributylphosphine may also be utilized effectively.

These organic phosphine catalysts are preferably used in amounts from about 0.05 to 5 parts per one hundred parts of polyepoxide (phr), although from about 0.5 to 2.0 phr are usually employed.

The preferred phosphine derivatives include the organic phosphonium halides having the general formula:

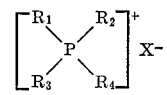

wherein $R_1$ is an organic radical, $R_2$, $R_3$, and $R_4$ is a hydrogen atom or an organic radical, and preferably an alkyl and/or aryl radical, and X is a halide, preferably chloride or bromide. Suitable organic phosphonium halides, include, among others, tributyl phosphonium chloride, tributyl phosphonium bromide, tributyl phosphonium iodide, triphenyl phosphonium chloride, triphenyl phosphonium bromide, triphenyl phosphonium iodide, methyl dibutyl phosphonium chloride, methyl dibutyl phosphonium bromide, methyl dibutyl phosphonium iodide, ethyl dibutyl phosphonium chloride, methyl dibutyl phosphobromide, ethyl dibutyl phosphonium iodide, butyl diphenyl phosphonium chloride, butyl diphenyl phosphonium bromide, butyl diphenyl phosphonium iodide, methyl diphenyl phosphonium chloride, methyl diphenyl phosphonium bromide, ethyl diphenyl phosphonium chloride, ethyl diphenyl phosphonium bromide, n-butyl triphenyl phosphonium chloride, n-butyl triphenyl phosphonium iodide, ethyl triphenyl phosphonium chloride, propyl tributyl phosphonium iodide, and methyl triphenyl phosphonium chloride.

POLYISOCYANATE COMPONENT

In general, any organic polyisocyanate (or polyisothiocyanate) may be used to cross-link (cure) the polyepoxide-dimer acid-amine precondensate.

Thte organic polyisocyanate or polyisothiocyanate may be an aliphatic, cycloaliphatic, or aromatic compound or a derivative thereof provided any such derivative contains no substituent which interferes with the reaction. Thus, if desired, it may be used in the form of a functional derivative containing "masked" or "blocked" isocyanato or isothiocyanato groups, free isocyanato or isothiocyanato groups being formed from "masked" or "blocked" groups by the action of heat. Examples of such functional derivatives include dissociable polymers such as dimers; dissociable addition products of organic polyisocyanates or polyisothiocyanates with phenol, and non-dissociable addition products of organic polyisocyanates or polyisothiocyanates with suitable aliphatic polyhydroxy compounds, such as, for example, dimethylol propane, trimethylol propane and glycerol. It should be noted that in the non-dissociable addition products certain free isocyanate or isothiocyanate groups are present, but they are sterically hindered to such a degree that they are substantially unreactive at ordinary room temperatures, though they can react at a useful rate if heat is applied. The dissociable polymers and dissociable and non-dissociable addition products can be useful in reducing toxicity risks.

Advantageously, a difunctional organic isocyanate is used. Examples of suitable isocyanates and isothiocyanates are polymethylene diisocyanates and diisothiocyanates, such as ethylene diisocyanate, trimethylene diisocyanate, tetramethylene diisocyanate and pentamethylene diisocyanate; and the corresponding diisothiocyanates, alkylene diisocyanates and diisothiocyanates, such as propylene-1,2-diisocyanate, butylene-1,2-diisocyanate, butylene-1,3-diisocyanate, butylene-2,3-diisocyanates, and butylene-1,3-diisothiocyanate; alkylidene diisocyanate and diisothiocyanates, such as ethylidene diisocyanate, butylidene diisocyanate and ethylidene diisothiocyanate; cycloalkylene diisocyanates and diisothiocyanates, such as cyclopentylene-1,3-diisocyanate, cyclohexylene-1,4-diisocyanate and cyclohexylene 1,2-diisothiocyanate; cycloalkylidene diisocyanates and diisothiocyanates, such as cyclopentylidene diisocyanate, cyclohexylidene diisocyanate and cyclohexylidene diisothiocyanate; aromatic diisocyanates and diisothiocyanates, such as metaphenylene diisocyanate, paraphenylene diisocyanates, 1 - methyl - 2,4-phenylene diisocyanate, naphthylene - 1,4-diisocyanate, diphenylene-4,4'-diisocyanate or p-phenylene diisothiocyanate; aliphatic-aromatic diisocyanates or diisothiocyanates, such as xylene - 1,4-diisocyanates, xylylene-1,3-diisocyanate, 4,4'-diphenylenemethane diisocyanate, 4,4'-diphenylene-propane diisocyanate, xylylene-1,4-diisothiocyanate or durene diisocyanate. In fact, any polyisocyanate or polyisothiocyanate of the general formula $R(NCX)_{n+1}$, in which $n$ is any integer, X is oxygen or sulfur and R is a polyvalent organic radical may be employed, though aromatic diisocyanates, for example, a toluene diisocyanate or isomeric mixtures thereof are preferred.

As noted hereinbefore, the precondensate resin is an epoxy-terminated resin. A solution of the precondensate resin and polyisocyanate is then prepared in a suitable organic solvent or blend thereof and applied by conventional techniques such as painting, dipping, spraying and the like.

Suitable solvents include the ketones such as acetone, methyl ethyl ketone, methyl isobutyl ketone; esters such as ethyl acetate, butyl acetate, Cellosolve acetate (acetate of ethylene glycol monoethyl ether), methyl Cellosolve acetate (acetate of ethylene glycol monoethyl ether), etc., chlorinated solvents such as trichloropropane, carbon tetrachloride, chloroform, etc.; aromatic hydrocarbons such as benzene, toluene, xylene, etc., mineral spirits, naphthas and other aromatic petroleum distillates. Mixtures or blends may be conveniently employed.

In general, the solutions will range from about 20% to 50% non-volatile, although dispersions or solutions outside this range may be employed.

The amounts of precondensate and polyisocyanate will vary widely, depending on the epoxy equivalent weight of the precondensate and the functionality of the polyisocyanate components.

In general, the polyepoxide precondensate and polyisocyanate are employed in amounts so that from 0.5 to about 1.5 chemical equivalents of polyisocyanate are employed per chemical equivalent of polyepoxide precondensate.

The invention is illustrated by the following examples. The reactants, their proportions and other specific ingredients of the formulations are presented as being typical and various modifications can be made in view of the foregoing disclosure without departing from the spirit or scope of the disclosure or of the claims. Unless otherwise specified, parts and percentages disclosed are by weight.

EXAMPLE I

This example illustrates the control of potlife and cure rate achieved by the present compositions.

Preparation of precondensate

Into a four-necked flask equipped with stirrer, nitrogen blanket, thermometer, condenser and heating mantle were charged 74.94 parts by weight of Polyether A [a glycidyl polyether of 2,2-bis(4-hydroxyphenyl)propane having an average molecular weight of 370 and an epoxide equivalent of about 190], 10.01 parts by weight of EMPOL® 1014 dimer acid [a viscous, aliphatic polymeric acid produced by the polymerization of unsaturated fatty acids at mid-molecule and containing 1% $C_{18}$ monobasic fatty acid, 95% $C_{36}$ dibasic fatty acid, and 4% $C_{54}$ tribasic fatty acid; acid number of 194–198; saponification number of 197–201 and a color (Gardner 1963 max.) of 5], and 0.08 part by weight of triphenylphosphonium ethyliodide. The temperature was then raised to 150° C. and held for 30 minutes, and then cooled to 120° C. Then 7.63 parts by weight of cyclohexylamine and 7.30 parts by weight of aniline were added and the mixture allowed to exotherm for about 60 minutes. After agitation for about 20 minutes after the peak (200° C). the precondensate was poured out and allowed to cool.

Preparation of composition

A coating composition was then prepared by mixing 71.0 parts by weight of a 25% non-volatile solution of the precondensate resin in a mixture of ethyl acetate, Cellosolve®acetate and toluene (equal parts by volume) with 29.0 parts by weight of a 25% non-volatile solution of Isonate 143L (a liquid diphenylmethane diisocyanate) in the same solvent blend.

Film preparation

In order to simulate low temperature conditions, both base and curing agent components were cooled to 35° F. before mixing. Films 1 mil thick (dry thickness) were applied by draw-down on solvent-cleaned, cold-rolled steel. The panels were placed in a cold box maintained at 35° F. and 80–90% relative humidity. After 7 days in the cold box, the panels were tested for development of methylisobutyl ketone (MIBK) and toluene resistance to determine degree of cure.

Using the above test procedure, resin formulations of several degrees of reactivity (cyclohexylamine level) were prepared in which the weight per epoxy (WPE) was held constant at about 2250. The formulations and test results are shown in Table I.

TABLE I

| Resin composition: | | | | | | |
|---|---|---|---|---|---|---|
| Polyether A | 74.64 | 74.94 | 75.01 | 75.07 | 75.15 | 75.22 |
| Empol 1014 | 10.01 | 10.05 | 10.06 | 10.07 | 10.08 | 10.09 |
| Triphenylphosphine/ethyl iodide | .08 | .08 | .08 | .08 | .08 | .08 |
| Cyclohexylamine | 15.27 | 7.63 | 5.65 | 3.82 | 1.98 | 0.00 |
| Aniline | 0.00 | 7.30 | 9.20 | 10.96 | 12.71 | 14.61 |
| Total | 100.00 | 100.00 | 100.00 | 100.00 | 100.00 | 100.00 |
| Curing agent, Isonate 143L (75% of NCO/OH stoich.) | 40.80 | | | | | 40.80 |
| Pot life,[1] hours | ½–¾ | 1½–1¾ | 2¼–2½ | 4¼–4½ | 10–11 | 22–23 |
| Film properties after 7 days at 35° F.: | | | | | | |
| MIBK resistance,[2] in minutes: | | | | | | |
| Pass | 20 | 10 | 5 | 1 | 1 | 1 |
| Fail | 25 | 15 | 10 | 5 | 5 | 5 |
| Toluene resistance,[2] in minutes: | | | | | | |
| Pass | >60 | 15 | 10 | 10 | 5 | 1 |
| Fail | | 20 | 15 | 15 | 10 | 5 |

[1] Time to gel at 75–80° F., at 25% nonvolatile in mixture of equal parts ethyl acetate (99%) Cellosolve acetate (urethane grade) and toluene.
[2] Immersion time before softening (to fingernail) occurs.

EXAMPLE II

The procedures of Example I were substantially repeated except that Isonate 143L was replaced with equivalent amounts of each of the following polyisocyanates: an isomeric mixture of tolylene diisocyanate; propylene-1,2-diisothiocyanate; bis(4-isocyanatophenyl)-methane and Modur® CB75 (an adduct prepared from 3 moles of tolylene diisocyante and 1 mole of trimethylolpropane). Related results were obtained in all instances.

EXAMPLE III

The procedures of Example I were substantially repeated except that Polyether A was replaced with an equivalent amount of glycidyl polyether of 2,2-bis(4-hydroxyphenyl)propane having an average molecular weight of about 1400 and an approximate epoxide equivalent weight of about 950. Related results were obtained.

In summary, an epoxy/polymeric fatty acid resin is first prepared by reacting from 0.1 to 0.9 chemical equivalent of polymeric fatty acids with 1.0 chemical equivalent of polyepoxide, with from 0.5:1.0 to 0.75:1.0 being preferred. Then this epoxy-terminated resin is reacted with the special mixture of aromatic and aliphatic amines in an amount from about 0.1 to 0.90 chemical equivalent of the amine mixture to 1.0 chemical equivalents of the epoxy-terminated resin, with from 0.5:1.0 to 0.75:1.0 being preferred. As noted hereinbefore, the weight ratio of aliphatic amine to aromatic amine in the mixture will range from about 4:1 to 1:4, with 1:2 to 2:1 being preferred.

The resulting polyepoxide precondensate resin is then mixed with a polyisocyanate in amounts so that from about 0.5 to about 1.5 chemical equivalents of the polyisocyanate are employed per chemical equivalent of the polyepoxide precondensate resin.

We claim as our invention:
1. A low-temperature curing composition prepared by reacting
   (A) An epoxy-terminated precondensate prepared by reacting
       (1) 0.1 to 0.9 chemical equivalent of a polymeric fatty acid selected from the group consisting of dimerized fatty acids, trimerized fatty acids and mixtures thereof, said fatty acids being unsaturated and containing at least 12 carbon atoms, with (2) 1.0 chemical equivalent of a polyepoxide having more than one vic-epoxy group in the molecule, and then reacting said epoxypolymeric acid product with (3) 0.1 to 0.9 chemical equivalent of an amine blend per 1.0 chemical equivalents of said epoxy-polymeric acid product, said amine blend comprising a weight ratio of aromatic amines to aliphatic amines of from 4:1 to 1:4, with
   (B) from 0.5 to 1.5 chemical equivalents of an organic polyisocyanate or polyisothiocyanate per chemical equivalent of the polyepoxide precondensate of (A).
2. A composition as in claim 1 wherein the polyepoxide is a glycidyl polyether of a polyhydric phenol or a polyhydric alcohol.
3. A composition as in claim 1 wherein the polyepoxide is a glycidyl polyether of 2,2-bis(4-hydroxyphenyl)propane.
4. A composition as in claim 1 wherein up to 50% by weight of the polymeric fatty acid is replaced with a saturated, aliphatic, dicarboxylic acid having from 6 to 10 carbon atoms.
5. A composition as in claim 1 wherein the aromatic amine is aniline.
6. A composition as in claim 1 wherein the aliphatic amine is cyclohexylamine.
7. A composition as in claim 1 wherein the organic polyisocyanate is tolylene diisocyanate.
8. A composition as in claim 1 wherein the organic polyisocyanate is diphenyl methane diisocyanate.
9. A composition as in claim 1 wherein the epoxy resin-polymeric fatty acid reaction is conducted in the presence of a catalyst selected from the group consisting of organo-substituted phosphines and organic phosphonium halides.
10. A composition as in claim 9 wherein the organic phosphonium halide is ethyltriphenyl phosphonium iodide.

References Cited

UNITED STATES PATENTS

| 3,057,809 | 10/1962 | Newey et al. | 260—18 EP |
| 3,446,762 | 5/1969 | Lopez et al. | 260—18 EP |
| 3,366,600 | 1/1968 | Haberlin et al. | 260—47 |
| 3,409,591 | 11/1968 | Landua et al. | 260—18 |
| 3,454,421 | 7/1969 | Westbrook | 260—47 |

FOREIGN PATENTS

| 566,464 | 11/1958 | Canada | 260—18 EPTN |
| 763,347 | 12/1956 | Great Britain | 260—830 P |

DONALD E. CZAJA, Primary Examiner

E. C. RZUCIDLO, Assistant Examiner

U.S. Cl. X.R.

117—161 KP, 161 ZB; 260—47 EN, 830 R